United States Patent
Chowdhry

(10) Patent No.: US 9,965,358 B2
(45) Date of Patent: May 8, 2018

(54) SEAMLESS APPLICATION BACKUP AND RECOVERY USING METADATA

(75) Inventor: Tripatinder Chowdhry, El Granada, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 80 days.

(21) Appl. No.: 13/264,672

(22) PCT Filed: May 27, 2011

(86) PCT No.: PCT/US2011/038428
§ 371 (c)(1),
(2), (4) Date: Oct. 14, 2011

(87) PCT Pub. No.: WO2012/166102
PCT Pub. Date: Dec. 6, 2012

(65) Prior Publication Data
US 2012/0303583 A1    Nov. 29, 2012

(51) Int. Cl.
*G06F 17/30* (2006.01)
*G06F 11/14* (2006.01)

(52) U.S. Cl.
CPC ...... *G06F 11/1469* (2013.01); *G06F 11/1451* (2013.01); *G06F 11/1464* (2013.01)

(58) Field of Classification Search
CPC ............. G06F 11/1451; G06F 11/1464; G06F 11/1435; G06F 11/1469
See application file for complete search history.

(56) References Cited

U.S. PATENT DOCUMENTS 7,454,406 B2    11/2008  Kaplan et al.
7,552,358 B1     6/2009  Asgar-Deen et al.
(Continued)

FOREIGN PATENT DOCUMENTS

CN    101098343 A    1/2008
CN    101194464 A    6/2008
(Continued)

OTHER PUBLICATIONS

International Search Report for PCT/US2011/038428 dated Sep. 28, 2011.
(Continued)

*Primary Examiner* — Alicia Willoughby
(74) *Attorney, Agent, or Firm* — Amin, Turocy & Watson, LLP

(57) ABSTRACT

Technologies are generally described for systems and methods effective to provide a seamless backup and recovery of applications using metadata. In an example, metadata can be defined to map data associated with an application and provide the relationship of the data to the application. From the metadata, a backup system can create a capsule containing application data, and a payload containing application related data. The capsule can contain not just the application data, but also configuration information, and access parameters. The capsule and payload can be associated together and saved by the backup system. In another example, to recover an application, a capsule and a payload can be retrieved, and using the metadata, the capsule can be unpacked to reinstall the application to the same state it was in when backed up, and the application related data can be restored from the payload.

25 Claims, 11 Drawing Sheets

(56) References Cited

U.S. PATENT DOCUMENTS

| | | | |
|---|---|---|---|
| 7,797,285 | B1 | 9/2010 | Rivera et al. |
| 7,974,954 | B2* | 7/2011 | Aridome et al. ............. 707/674 |
| 8,266,112 | B1* | 9/2012 | Beatty ................. G06F 11/1469 707/610 |
| 8,370,294 | B2* | 2/2013 | Lyakhovitskiy .............. 707/609 |
| 8,438,133 | B2* | 5/2013 | Taniguchi .................... 707/640 |
| 8,473,462 | B1* | 6/2013 | Banerjee ....................... 707/640 |
| 2004/0193953 | A1* | 9/2004 | Callahan ............ G06F 11/1451 714/15 |
| 2006/0010174 | A1 | 1/2006 | Nguyen et al. |
| 2006/0248038 | A1* | 11/2006 | Kaplan et al. .................... 707/1 |
| 2006/0294419 | A1* | 12/2006 | Schneider ........... G06F 11/1451 714/15 |
| 2007/0174362 | A1* | 7/2007 | Pham et al. .................. 707/204 |
| 2008/0162599 | A1 | 7/2008 | Mittal et al. |
| 2008/0222043 | A1* | 9/2008 | Chefalas ............ G06F 11/1469 705/59 |
| 2009/0204648 | A1 | 8/2009 | Best et al. |
| 2010/0023520 | A1* | 1/2010 | Barboy ............... G06F 17/3007 707/E17.007 |
| 2010/0070515 | A1 | 3/2010 | Dutton et al. |
| 2010/0325167 | A1 | 12/2010 | Landry |
| 2011/0016089 | A1* | 1/2011 | Freedman ........... G06F 11/1451 707/640 |
| 2011/0007811 | A1 | 3/2011 | Kushwah |
| 2012/0254116 | A1* | 10/2012 | Thereska et al. ............. 707/640 |
| 2012/0254118 | A1* | 10/2012 | Shah et al. .................... 707/645 |

FOREIGN PATENT DOCUMENTS

| | | |
|---|---|---|
| CN | 102239476 A | 11/2011 |
| WO | 2007001918 A2 | 1/2007 |

OTHER PUBLICATIONS

"Android beats Apple App Store growth," accessed at http://www.bizjournals.com/sanjose/news/2011/01/12/android-beats-apple-app-store-growth.html?ana=yfcpc, posted on Jan. 12, 2011, pp. 3.

"Microsoft fights Apple over 'App Store'," accessed at http://www.bizjournals.com/sanjose/news/2011/01/12microsoft-fights-apple-over-app-store.html?ana=yfcpc, posted on Jan. 12, 2011, pp. 3.

"Microsoft objects to Apple's "App Store" trademark application," accessed at http://web.archive.org/web/20110518164319/http://www.appleinsider.com/articles/11/01/12/microsoft_objects_to_apples_app_store_trademark_application.html, posted on Jan. 12, 2011, pp. 4.

Cameron, C., "Breaking Down Apple's AppStore Stats [Infographic]," accessed at http://readwrite.com/2010/06/07/breaking_down_apples_appstore_stats_infographic, posted on Jun. 7, 2010, pp. 4.

Perez, S., "The Top Mobile Apps of 2010, According to Apple, GetJar and Others," accessed at http://readwrite.com/2010/12/09/top_mobile_apps_of_2010_according_to_apple_getjar_and_others, posted on Dec. 9, 2010, pp. 17.

Watters, A., "Mac App Store Open for Business with 1000's of Apps," accessed at http://readwrite.com/2011/01/05/mac_app_store_open_for_business_with_1000s_of_apps, posted on Jan. 6, 2011, pp. 4.

* cited by examiner

SEAMLESS APPLICATION BACKUP AND RECOVERY USING METADATA

CROSS-REFERENCE TO RELATED APPLICATION

The subject application is the U.S. National Stage filing under 35 U.S.C. § 371 of International Application No. PCT/US11/38428, filed on May 27, 2011, and entitled "SEAMLESS APPLICATION BACKUP AND RECOVERY USING METADATA," the disclosure of which is incorporated herein by reference in its entirety.

TECHNICAL FIELD

The subject disclosure relates generally to the backup and recovery of applications using metadata.

BACKGROUND

The software industry is in the midst of change. As hand-held devices and tablets proliferate, the number of applications developed for and stored on these devices grows exponentially. Before this sea of change in the software landscape, personal computers (PCs) on average had from 8 to 45 applications installed per PC. On an average smart phone however, the average is closer to 85 applications per phone. Tablets likewise have an attach rate that averages about 60 applications per tablet. As online appstores become more common, the application attach rate for hand-held devices, tablets and PCs is likely to increase even further.

Conventional backup systems are focused primarily on backing up an individual folder or a set of folders. When the inevitable system failure or hard drive crash occurs, such backup systems will recover folders or files, but the applications are not automatically reinstalled. Manually reinstalling the application and then restoring the data and associations between the data and the application is required. This task is exacerbated by the explosion in the number of applications found on PCs and other devices which can make the reinstallation process unmanageable.

System backup and recovery is further complicated as various categories of applications have different requirements for their backup needs. Some applications are self-contained on a device and only need to be reinstalled. Other applications may be hybrids where an application may reside on a device, but data associated with the application resides on the cloud. Similarly, an application may be a multi-hybrid, where some part of the application resides on the device, and some part of the application resides on the cloud, and where the data resides on both the device and the cloud.

The above-described deficiencies of conventional approaches to system and application backup and recovery are merely intended to provide an overview of some of the problems of conventional approaches and techniques, and are not intended to be exhaustive. Other problems with conventional systems and techniques, and corresponding benefits of the various non-limiting embodiments described herein may become further apparent upon review of the following description.

SUMMARY

In various non-limiting embodiments, systems and methods are provided for seamless application backup and recovery using metadata. In an example, a computing device can receive metadata associated with an application, the computing device can then collect, based on the metadata, a first portion of information relating to the application, and a second portion of information relating to the application, where the first portion of information is different from the second portion of information. When the first portion of information and the second portion of information are collected, the computing device can encapsulate the first portion of information and encapsulate the second portion of information to be stored in a storage medium for backup.

In another embodiment, metadata associated with an application can be retrieved, and a capsule and a payload that correspond to the application may also be retrieved. Application configuration information, installation data, and an access parameter may be extracted from the application capsule, and used to recover the application. Also, application specific data extracted from the payload is restored in accordance with the metadata.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

Various non-limiting embodiments are further described with reference to the accompanying drawings in which.

DETAILED DESCRIPTION

Overview

Figure 1:
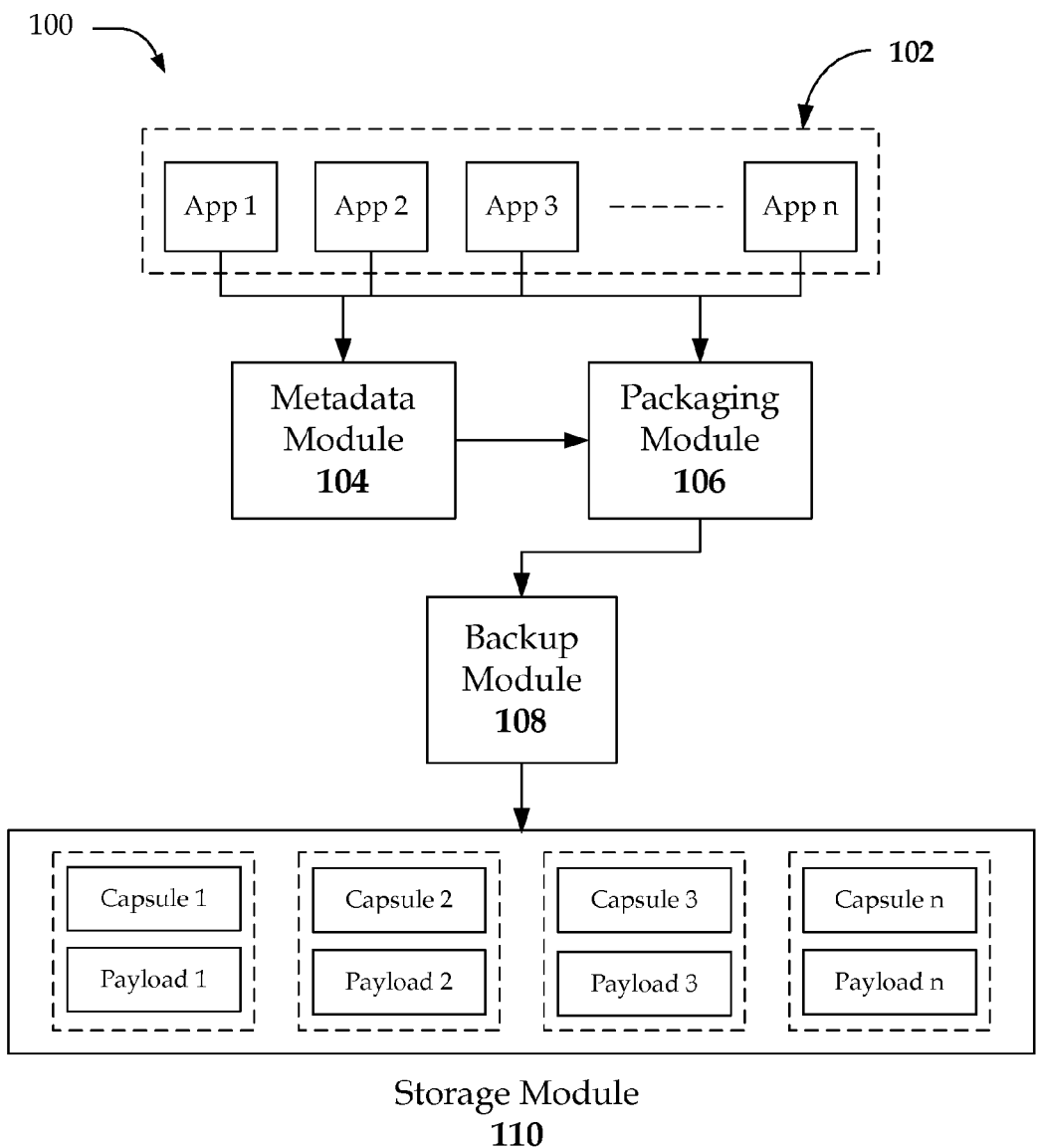
FIG. 1 is a block diagram illustrating an example, non limiting embodiment of a system for backing up a set of applications.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

As discussed above, conventional approaches to handling the backup and recovery of a variety of applications have focused primarily on backing up individual files and folders without also seamlessly backing up the applications and their associated data. For example, conventional approaches will backup specified folders, and in the case of a hard drive crash or system failure, will replace the backed up folders in their original locations but will not necessarily reinstall the applications and the application specific data.

In various, non-limiting embodiments, a seamless backup and recovery system is provided that backs up applications and related data into their constituent parts. Upon or in response to recovery, the application may be restored intact and with all the data generated by or utilized by the application recovered automatically.

By way of example, FIG. 1 illustrates a block diagram of an example, non-limiting embodiment of a system for backing up applications. As shown in FIG. 1, a backup system 100 is provided to backup a set of installed applications 102 on a storage module 110. A metadata module 104 can define metadata associated with at least one of the applications, and the metadata may be read by a packaging module 106 to create a capsule and payload for each of the set of installed applications 102 based on the defined metadata. A backup module 108 can receive the capsules and payloads, assign an identifier to each capsule and payload, and store the capsule and payload on storage module 110.

A set of installed applications 102 can be installed on a hand-held device, a tablet, a PC, or any computing device capable of having applications installed upon it. It is noted that while the term device is used throughout this document, it can refer to any of the above mentioned computing devices. The set of installed applications 102 may also be installed completely on a cloud network, or some hybrid thereof, where part of an application resides on the cloud, and the remaining portion of the application is on the computing device.

Metadata module 104 can define metadata associated with at least one of the set of installed applications 102. Metadata module 104 can be configured to map the location of data associated with the application as well as map the location of the application itself. The location of data associated with the application can be a logical address, a physical address, or a hierarchical address of the data. In an example, metadata module 104 can provide the location of application related data on a device. Application related data can be installation files, data that constitutes the application or any data that is generated by or utilized by the application. Metadata module 104 can also determine the type of data being mapped, and indicate how the data is used by the application. Some application related data is for the operation or use of the application, while other application related data may be a product of the application.

In another example, metadata module 104 can also be configured to map a network to determine the location of application related data on the network as well as on the device. Metadata module 104 can also collect and define instructions for installing the application. The instructions may be gathered from the application folders, from the application, or from the Internet. Metadata module 104 can also define the instructions for installing the application based on the original installation of the application.

Metadata module 104 can also create a configuration file for each application, which can define the location of the application. The configuration file can also include attributes of the application that can be used to backup and recover the application, such as modifications to the application and user-selectable configurations of the application. Metadata module 104 can further define access parameters if any are required for an application to run. Access parameters can be product registration keys, activation keys, passwords and other required information needed to backup and recover the application. In an example, metadata module 104 can create and define metadata for each application and associate a defined metafile with each application. In another example, a metafile can be associated with the set of installed applications. It should be clear from the foregoing that metadata defined by metadata module 104 can be unique for every application.

In a further, non-limiting embodiment, metadata module 104 can define the metadata for an application based on a metafile that is pre-associated with the application. The pre-associated metafile may be produced by another application, can be user-created, or can come packaged with the installed application. Metadata module 104 can either fully incorporate the pre-associated metafile into the defined metadata, or the metadata module can be configured to analyze the pre-associated metafile and use the relevant portions of the pre-associated metafile, if any, to define the metadata for the application.

Packaging module 106 can be configured to receive the defined metadata for an application from metadata module 104. Based on the received metadata, packaging module 106 can gather the information related to an application from the set of installed applications 102. Packaging module 106 can create a capsule from a first portion of information gathered. The first portion of information can include information that is used to reinstall an application. Such information can includes, but is not limited to: installation files, configuration instructions, access parameters, and other data used by the application to operate. The first portion of information can be encapsulated or packaged into a capsule. In one example, the capsule may just contain the information that has been packaged without compression, whereas in another example, the information may be compressed to shrink the size of the capsule.

Packaging module 106 can also collect a second portion of information, based on the received metadata, from the set of installed applications 102 and can package the second portion of information into a payload. The second portion of information can be data that is associated with the application, and is generated by or utilized by the application. As above, the packaging module 106 may encapsulate the payload containing the files in a compressed format, or an uncompressed format.

In one embodiment, packaging module 106 can select information to be included in either the capsule or the payload based on the type of data to be packaged as indicated by the metadata module 104. If metadata module 104 indicates that the information is at least one of configuration information, installation instructions, installation data, access parameters, or other data used by the application to execute, packaging module 106 can encapsulate the data into a capsule. Alternatively, if metadata module 104 indicates that the mapped data is not used to execute the application, or is data generated by, or utilized by the application, the data files can be packaged into a payload.

Backup module 108 can be configured to receive the packaged capsule and payload from packaging module 106 and prepare the capsule and payload for backup. The payload and capsule are associated together in storage, so that a capsule is stored with the corresponding payload. Backup module 108 can also assign an identifier to each capsule and payload, and retain a record of the identifier. An identifier can also be assigned to the capsule and payload set. The identifier can indicate at least one of the time and date of backup, the name of the application, version of the application, the device or PC that the application is installed on, or which user or what process initiated the backup. The identifier assigned to each capsule and payload can enable a search to be made for capsules and payloads meeting the search parameters.

In a further embodiment, backup module 108 can associate the capsules with the corresponding payloads of a specific application to distinguish them from the capsules and payloads that correspond to different applications.

Backup module 108 can be further configured to store the associated capsule and payloads in storage module 110. Storage module 110 can be local storage on the computing device, or a USB flash drive, external hard-drive, floppy disk, tape drive, or any other commonly used mobile storage devices. Storage module 110 can also be a network device, network drive, or a remote storage location. In one example, the remote storage location can be an internet based storage location, or in a further example can be on a Local Area Network.

In one embodiment, storage module 110 can include just one set of a capsule and payload, or can include multiple capsules and payloads corresponding to one application. In a further embodiment, storage module 110 can retain capsules and payloads that correspond to multiple applications on a single device or PC. In a still further embodiment, storage module 110, can store capsules and payloads from multiple devices. Further to this embodiment, storage module 110 can therefore serve as storage for multiple devices that are being backed up. In this example, the identifier assigned by backup module 108 can identify to which device each capsule and payload set correspond to.

Figure 2:
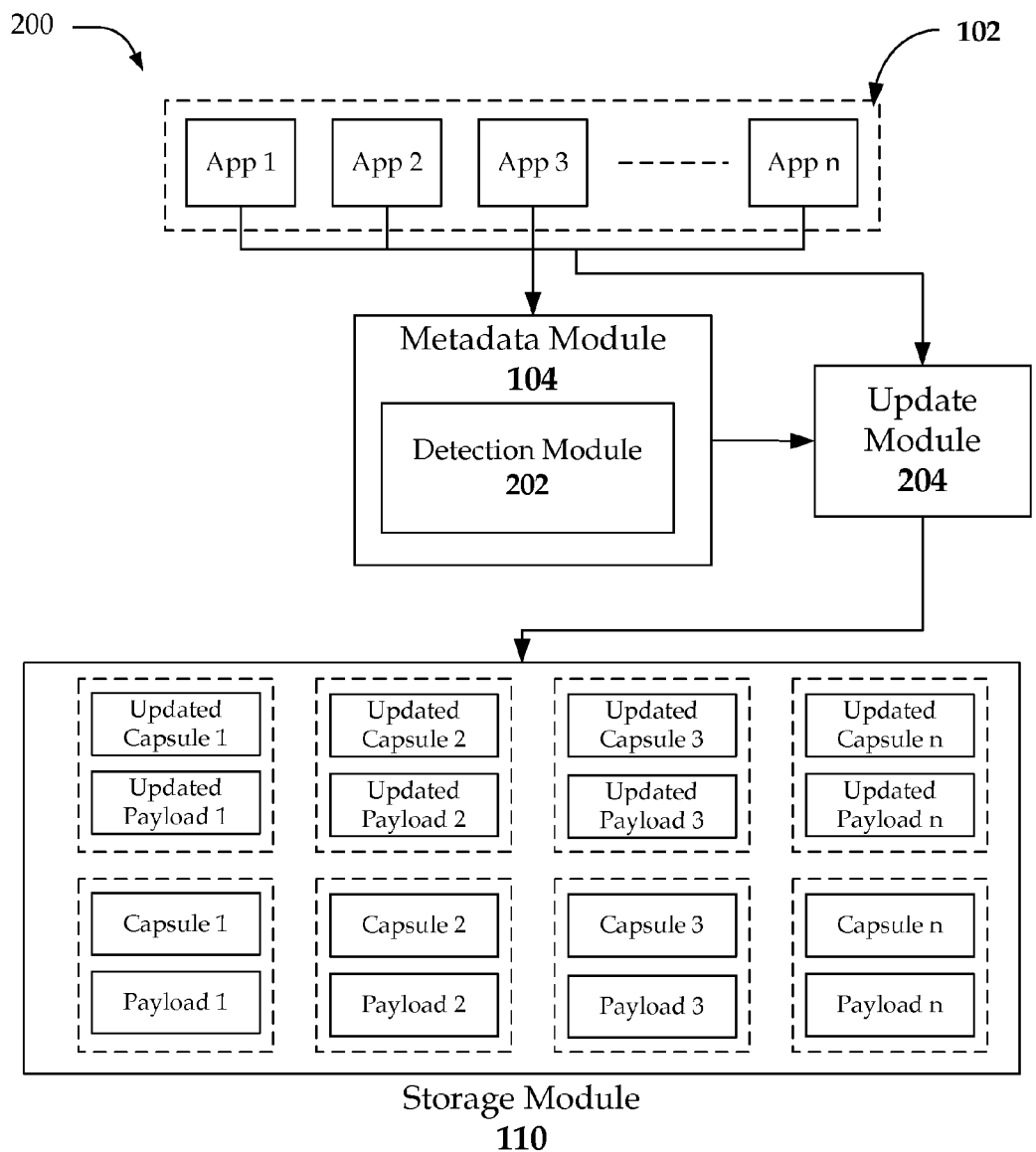
FIG. 2 is a block diagram illustrating an example, non-limiting embodiment of an update system that detects changes in a set of applications, and updates the backed up application components.

Turning now to FIG. 2, a block diagram of an example, non-limiting embodiment of an update system that detects changes in a set of applications, and updates the backed up application components is shown. As shown in FIG. 2, a system 200 can include the set of installed applications 102, metadata module 104, an update module 204, and storage module 110. Metadata module 104 can further include a detection module 202. Detection module 202 can detect changes or alterations of an application in the set of installed applications 102, and revise the metadata associated with the application. Update module 204 can use the revised metadata to package and backup new capsules and payloads and store them in parallel with existing capsules and payloads on storage module 110.

In an embodiment, detection module 202 can monitor the data mapped by the metadata, and detect changes in an application. When changes are detected, detection module 202 can create new metadata or modify the existing metadata associated with the application. Changes detected can include, but are not limited to, changes in the version of an application, configuration changes, changes in the location of where the application can be found and etc. Detection module 202 can also detect changes in the application specific data that is generated by, or used by the application. Changes to this data can include, but are not limited to, changed files, deleted files, and added files.

In a further embodiment, detection module 202 can be configured to scan for changes in accordance with a schedule. Such a schedule can direct the detection module to scan for changes in the application related data every hour, every day, every week, or at any other appropriate time interval. In a still further embodiment, detection module 202 can scan for changes in the application related data in response to a trigger event. A triggering can be, but is not limited to, the installation or deletion of an application, turning a device on or restarting a device, or detecting a new device. Upon the occurrence of the triggering event, detection module 202 can automatically search for changes in the data mapped by metadata module 104.

When detection module 202 detects a change, the metadata associated with the application can be modified by metadata module 104 to reflect the changes. The metadata can also be replaced with new metadata defined by metadata module 104, the new metadata having incorporated the changes in the application related data as detected by detection module 202.

Update module 204 can receive the updated metadata for an application, or a set of applications, from metadata module 104. Based on the updated metadata, update module 204 can gather the information related to the application or the set of applications to update the backed up capsules and payloads on storage module 110.

In one embodiment, update module 204 can be configured to receive the updated metadata, and create an additional capsule and an additional payload based on the updated metadata. The new capsule may be a complete capsule, and can be used to restore the application to the state that it was when the changes were detected by the detection module 202. The new payload can also be used to fully restore the application specific data. The update module can then assign an identifier to the new capsule and payload. The identifier can indicate at least one of the time and date of backup, the name of the application, version of the application, the device or PC that the application is installed on, or which user or what process initiated the backup.

Further to this embodiment, update module 204 can then transmit the new capsule and the new payload to storage module 110. Storage module 110 can either replace the previously backed up capsule and payload, or store the new and old capsules and payloads together. If the new and old capsules and payloads are both stored on storage module 110, the identifier assigned by backup module 108 and update module 204 respectively can serve to differentiate the capsules and payloads.

In another embodiment, update module 204 can retrieve a capsule and payload from the storage module. Update module 204 can temporarily unpack the capsule and payload. Update module 204 can then, based on the updated metadata, replace the old portions of information in the unpacked capsule and payload with the new changed portions in accordance with updated metadata. When the updating of the information is complete, update module 204 can then re-encapsulate the capsule and the package and send them back to storage module 110. Update module 204 can also update the identifier on the capsule and the payload to indicate that an update has taken place, and provide the time and date of the update.

In yet another embodiment, update module 204 can update just one of a capsule or a payload if detection module 202 detects alterations in only the first portion of information, or only the second portion of information. Further to this embodiment, the updated payload or the updated capsule can be associated with the previous capsules and payloads that correspond to the same application. In this way, one application can have an unequal number of capsules and payloads that constitute the application's backup.

Figure 3:
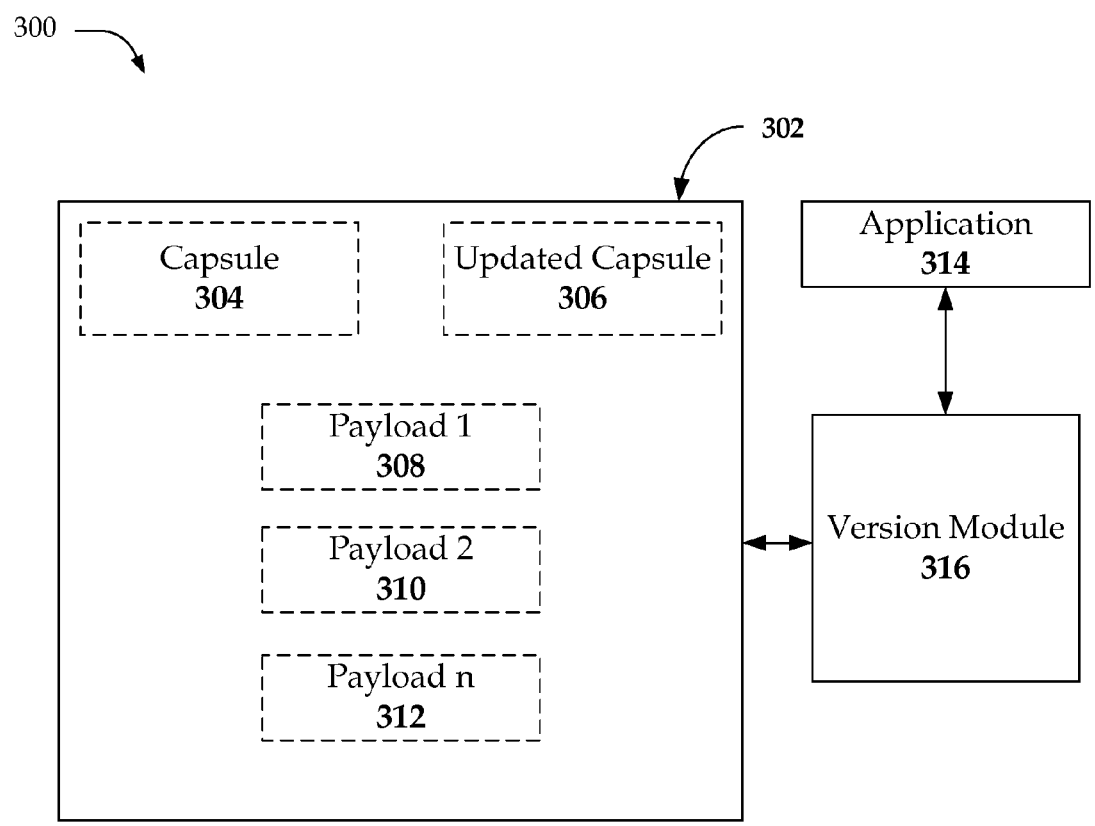
FIG. 3 is a block diagram illustrating an example, non-limiting embodiment of a versioning system for backing up applications.

Turning now to FIG. 3, a block diagram illustrating an example, non-limiting embodiment of a versioning system for backing up applications is shown. System 300 can include a set of capsules and payloads 302 that correspond to an installed application 314. The set of capsules and payloads 302 can further include a capsule 304, an updated capsule 306 and payloads 308-312. It is to be appreciated that while FIG. 3 shows two capsules and a set of payloads corresponding to the capsules, any combination of capsules and payloads is possible. A version module 316 can also be provided which can provide information regarding the version of the application and payload that are being backed up.

Version module 316 can work in conjunction with the backup system and update system of FIG. 1 and FIG. 2 respectively. Version module 316 can determine the version of application 314 and can indicate the version on the capsules that correspond to the application. As capsules are updated and added to the set of capsules and payloads 302, version module 316 can mark updated capsule 306, so that it is clear that it corresponds to the latest version of application 316.

The set of capsules and payloads 302 corresponds to application 314. Capsule 304 and updated capsule 306 can each contain the first portion of information that can include information that is used to reinstall application 314. Such information can include, but is not limited to, installation files, configuration instructions, access parameters, and other data that is used by the application to operate. Payloads 308-312 can each contain data that is associated with the application, and is generated by or utilized by the application. Each payload can be marked by version module 316 with a time and date that the payload was created. Each payload can also be associated with either capsule 304 or updated capsule 306.

Figure 4:
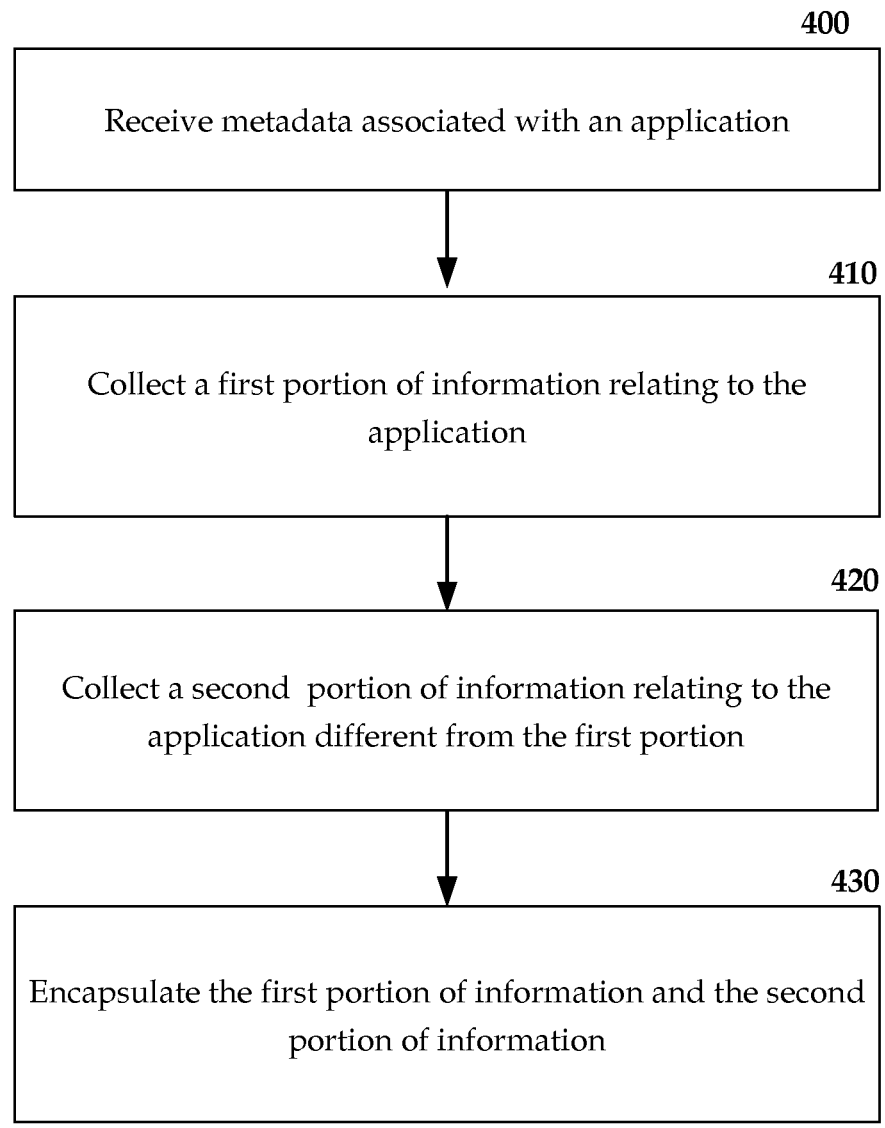
FIG. 4 illustrates a flow diagram of an example, non-limiting embodiment for backing up an application using metadata.
Figure 5:
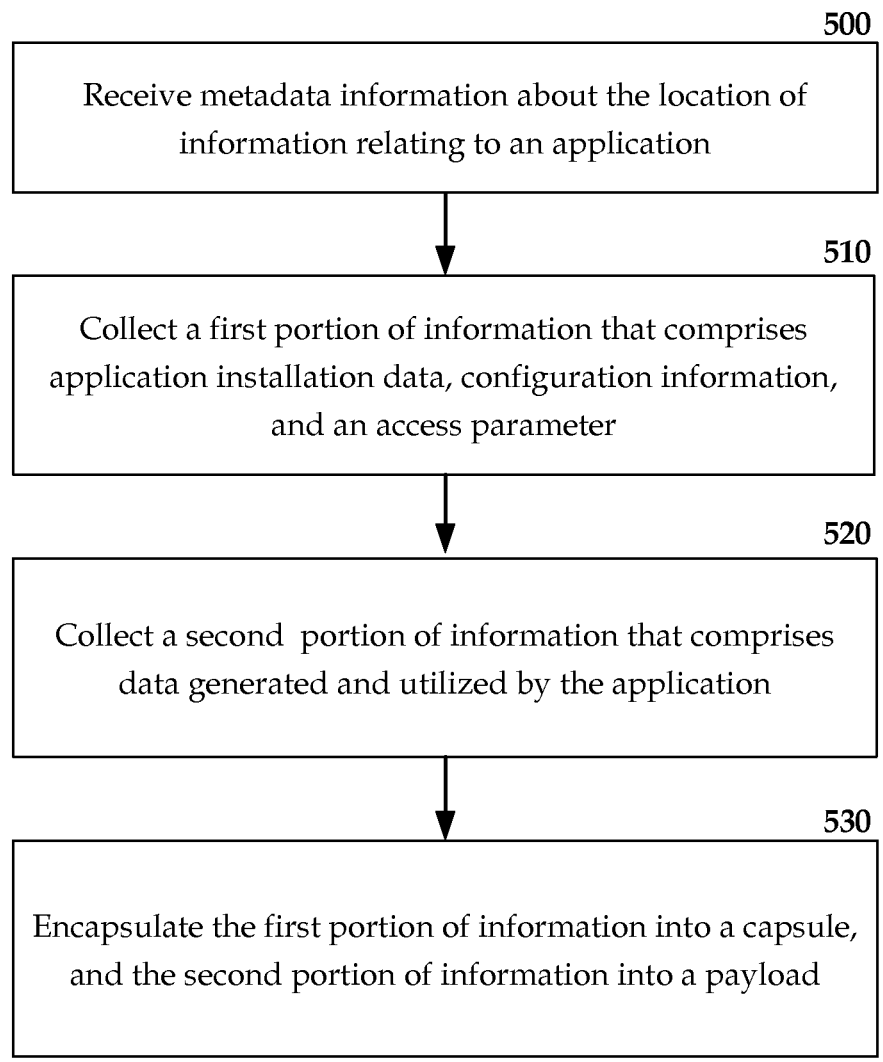
FIG. 5 illustrates a flow diagram of an example, non-limiting embodiment for backing up an application by creating a capsule and a payload.
Figure 6:
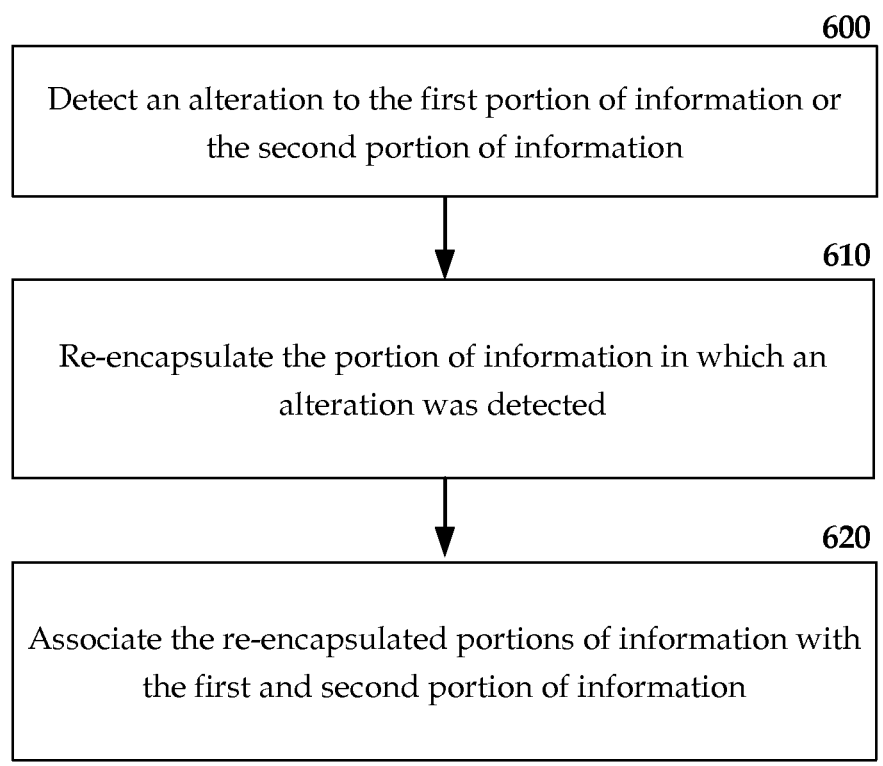
FIG. 6 illustrates a flow diagram of an example, non-limiting embodiment for detecting an alteration in an application and re-encapsulating the portions of information.

FIG. 4-FIG. 6 illustrate processes in connection with the aforementioned systems. The processes in FIG. 4-FIG. 6 can be implemented for example by systems 100, 200, or 300 illustrated in FIG. 1, FIG. 2, and FIG. 3 respectively FIG. 4 illustrates a flow diagram of an example, non-limiting embodiment for backing up an application using metadata. At 400, the backup process is initiated by receiving metadata associated with an application. The metadata can be defined by metadata module 104 as described above with regard to FIG. 1, or the metadata can be pre-associated with an application. The received metadata defines the location of information relating to an application, the type of data, and its relationship to the application. The received metadata can further differentiate the application related information into two categories, a first portion of information and a second portion of information.

At 410, a first portion of information relating to the application is collected, based on the metadata's differentiation of the application related information. The first portion of information can be collected by determining where the information is located using the metadata, and then gathering the information from the locations specified.

At 420, a second portion of information relating to the application is collected. The second portion of information is distinct from the first portion of information. Similar to the first portion as described above, the second portion of information can be collected based on the metadata's classification of the application related info. The metadata can further specify a location, or a set of locations where the second portion of information relating to the application can be found. Once the locations are determined, the information can be gathered.

At 430, the first and second portions of information are encapsulated. The first portion of information can be encapsulated into a capsule, and the second portion of information can be encapsulated into a payload. In one example, the encapsulation process can compress the capsule and the payload to make the size of the container smaller. In another example, the encapsulation can be executed without compression.

FIG. 5 illustrates a flow diagram of an example, non-limiting embodiment for backing up an application by creating a capsule and a payload. At 500, the backup process is initiated by receiving metadata associated with an application. The metadata can be defined by metadata module 104 as described above with regard to FIG. 1, or the metadata can be pre-associated with an application. The received metadata defines the location of information relating to an application, the type of data, and its relationship to the application. The received metadata can further differentiate the application related information into two categories, a first portion of information and a second portion of information. The first portion of information can include information that is used to reinstall an application. Such information includes, but is not limited to, application installation data, installation files, configuration instructions, access parameters, and other data that is used by the application to operate. The second portion of information can include data associated with the application, but is not necessary for execution of the application, such as data generated by or utilized by the application.

At 510, the first portion of information relating to the application is collected, based on the metadata's differentiation of the application related information. The first portion of information can be collected by using the metadata to determine where the information is located, and then gathering the information from the locations specified.

At 520, a second portion of information relating to the application is collected. The second portion of information, which includes data generated by or utilized by the application is also collected. The metadata can further specify a location, or a set of locations where the second portion of information relating to the application can be found. Once the locations are determined, the information can be gathered.

At 530, the first and second portions of information are encapsulated into a capsule and payload respectively. In one example, the encapsulation process can compress the capsule and the payload to make the size of the container smaller. In another example, the encapsulation can be executed without compression, by leaving the first portion of information and the second portion of information in their respective containers.

FIG. 6 illustrates a flow diagram of an example, non-limiting embodiment for detecting an alteration in an application and re-encapsulating the portions of information. At 600, an alteration to the first portion of information or the second portion of information is detected. The first portion of information and the second portion of information can together form the application related information that metadata module 104 mapped and created metadata for. The alteration detected can be alterations to both the first portion and the second portion, or alternatively can be a change in either the first portion or the second portion individually. The alterations detected can include, but are not limited to, changes in the version of an application, configuration changes, changes in the location of where the application can be found, or changes in the application specific data such as changed files, added files, or deleted files.

At 610, upon detection of an alteration the portion of information in which an alteration was detected can be re-encapsulated. The portion of information in which the alteration was detected can be collected, and once the information is collected, the portion of information can be encapsulated. As above, the encapsulation process can either compress the portion of information when encapsulating the portion, or the portion of information can be uncompressed.

The re-encapsulated portions of information can then be associated with the original encapsulated first and second portions that correspond to the same application. During the association process, the capsules and payloads can be marked to indicate when they were encapsulated, and what version of the application the capsules and payloads correspond to.

Figure 7:
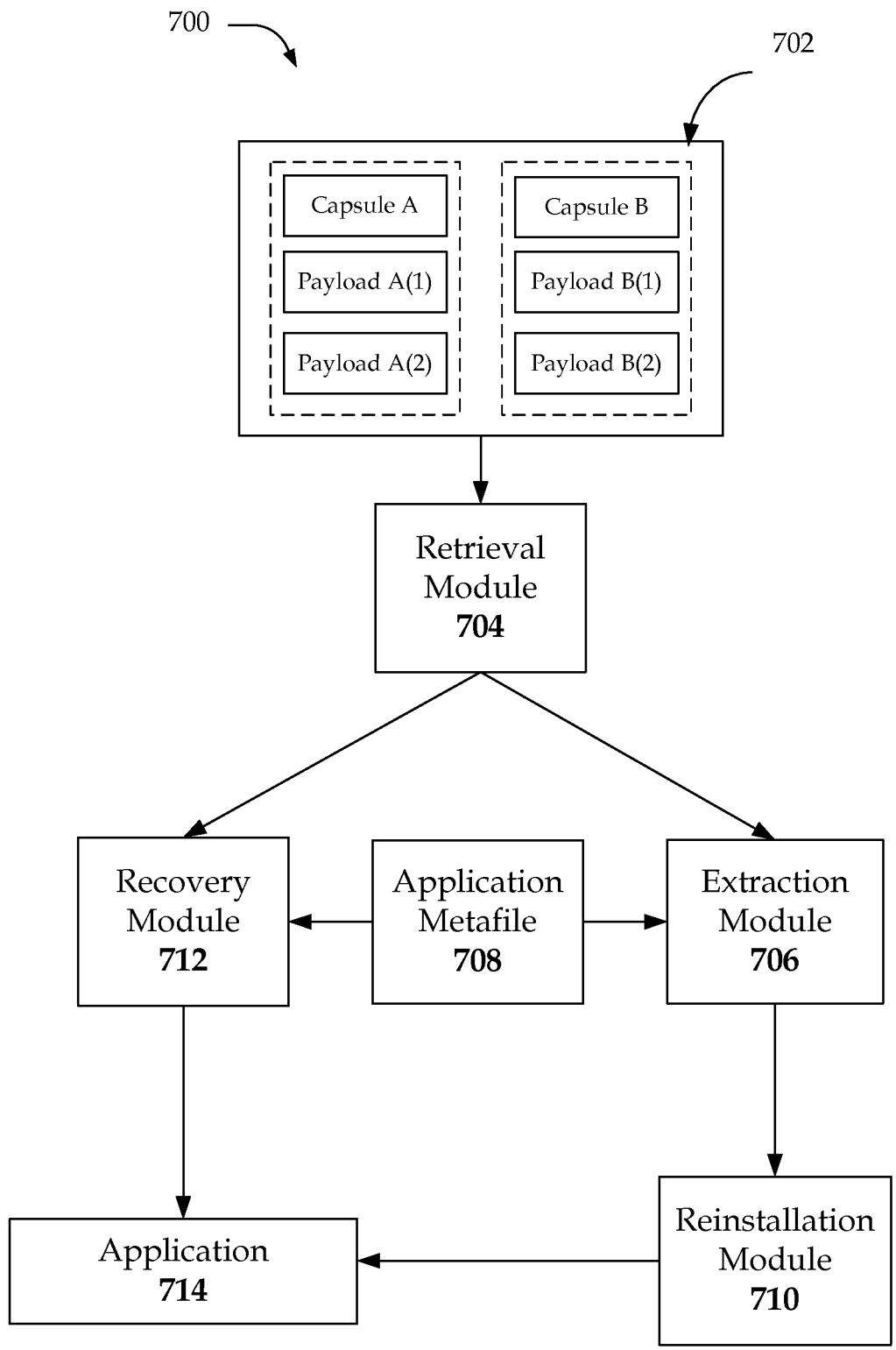
FIG. 7 is a block diagram illustrating an example, non-limiting embodiment of a recovery system for reinstalling an application and restoring data associated with the application.

By way of example, FIG. 7 illustrates an example, non-limiting embodiment of a recovery system for reinstalling an application 714 and restoring data associated with the application. As shown in FIG. 7, a storage module 702 can store a set of capsules with associated payloads. A retrieval module 704 can retrieve a selected capsule and payload from storage module 702, and can send the retrieved capsule and payload to an extraction module 706, and a recovery module 712 respectively. A reinstallation module 710 can be provided to reinstall the application, and a recovery module 712 is further provided to assist in restoring the application specific data. An application metafile 708 can also be provided to provide metadata associated with application to guide the recovery system.

Storage module 702 can be local storage on the computing device, or a USB flash drive, external hard-drive, floppy disk, tape drive, or any other commonly used mobile storage devices. Storage module 702 can also be a network device, network drive, or a remote storage location. In one example, the remote storage location can be an internet based storage location, or in a further example can be on a Local Area Network or Wide Area Network.

Retrieval module 704 can be configured to select a capsule and payload to retrieve a from storage module 702 through a variety of mechanisms. In one example, retrieval module 704 can receive instructions to retrieve the latest and most up to date capsule and payload. In another example, retrieval module 704 can be further configured to retrieve a user-specified capsule and payload. In yet another example, retrieval module 704 can retrieve a capsule and payload based on a set of parameters which can include the time and date the capsule or payload was updated, the version of the application that the capsule corresponds to, the size of the payload, or any combination thereof.

Extraction module 706 receives the retrieved capsule from retrieval module 704 and analyzes an application metafile 708. Application metafile 708 provides metadata that corresponds to the application that the retrieved capsule is associated with. Extraction module 706 can be configured to unpack the retrieved capsule and can be further configured to analyze the metafile to organize the contents of the capsule.

In one embodiment, the capsule contains data files and the analyzed metafile can provide information relating to the structure of the capsule, and based on the information, extraction module 706 can organize the unpacked data to prepare the data for reinstalling application 714. The metadata can contain information relating to the installation and configuration instructions, which allow reinstallation module 710 to reinstall the application in the correct location with the appropriate configuration.

In an additional embodiment, the unpacked capsule retains organization structure, and has the configuration instructions. In this case, the metafile can provide information about where to reinstall the application by for instance indicating which directories files are to be reinstalled to.

Based on the metadata, and using the extracted capsule contents from extraction module 706, reinstallation module 710 reinstalls application 714. The metadata can provide information about where to reinstall application 714, and the capsule contents can provide the installation data files, configuration instructions, and the access parameters needed to reinstall application 714.

In one embodiment, reinstallation module 710 can be configured to reinstall application 714 from a remote location. In another embodiment, reinstallation module 710 can be configured to reinstall application 714 locally, or can be configured to reinstall application 714 partially remotely and partially locally.

Once application 714 is reinstalled, recovery module 712 can restore application specific data that was not needed to install the application. Recovery module 712 receives the retrieved payload from the retrieval module 704, and can be configured to unpack the payload to access the application specific data. The recovery module can than analyze application metafile 708 to determine where to restore the application specific data to. The metadata can provide a list of locations for each file of the application specific data to be restored to, and the recovery module 712 can restore the data in accordance with the list.

Figure 8:
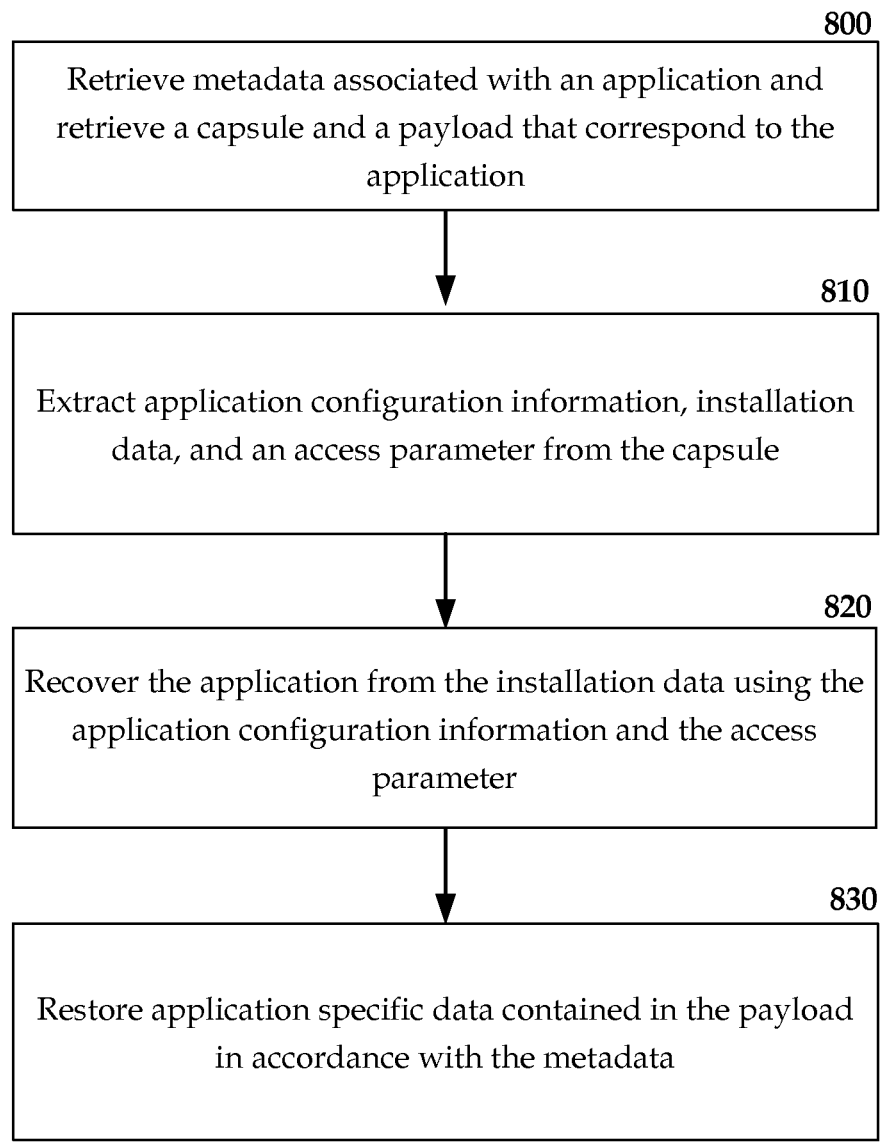
FIG. 8 is a flow diagram of an example, non-limiting embodiment for restoring an application from a capsule and payload using metadata.
Figure 9:
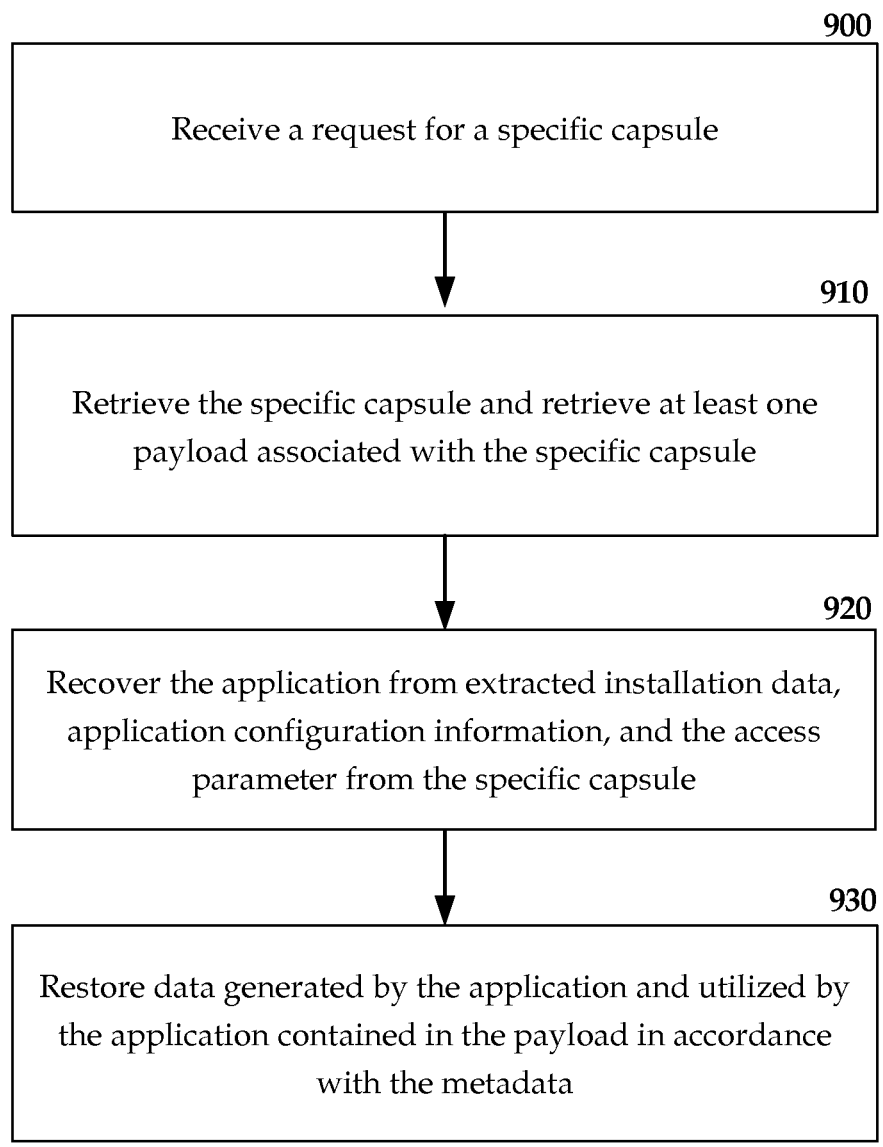
FIG. 9 is a flow diagram of an example, non-limiting embodiment for restoring an application from a specific capsule and an associated payload.

FIG. 8 and FIG. 9 illustrate processes in connection with the system illustrated in FIG. 7. The processes in FIG. 8 and FIG. 9 can be implemented for example by system 700.

FIG. 8 is a flow diagram of an example, non-limiting embodiment for restoring an application from a capsule and payload using metadata.

At 800, the restoration process is initiated by retrieving metadata that is associated with an application, and retrieving a capsule and payload that correspond to the same application. In one embodiment, the metadata can be read from a metafile that is stored separately from the capsule and payload. In another embodiment, the metadata can be stored with the capsule and payload.

At 810, application configuration information, installation data, and an access parameter are extracted from the capsule. The extraction process can include decompressing the capsule if the capsule is compressed and then extracting the component parts of the capsule, or it can just include the extraction if the capsule is not compressed. In one example, the retrieved metadata can also be used to provide structure to the extracted capsule components if there is none. Further to this example, the metadata can be used to identify the components of the capsule to determine which parts of the extracted capsule are application configuration information, installation data, and access parameters.

At 820, the application is recovered from the installation data using the application configuration information and the access parameter. The application configuration information, together with the metadata, guides the reinstallation process, and the access parameter can be used to provide access to the reinstalled application.

At 830, the application specific data in the payload is used to restore all data generated by or utilized by the application. The metadata provides a guide for the restoration process by directing the location to which the application specific data files are restored to.

FIG. 9 is a flow diagram of an example, non-limiting embodiment for restoring an application from a specific capsule and an associated payload.

At 900, a request for a specific capsule is retrieved. The request can be to retrieve the latest and most up to date capsule, or the request can be user specified. The request can also be based on a search for a capsule based on specified parameters which can include the time and date the capsule or payload was updated, the version of the application that the capsule corresponds to, the size of the payload, or any combination thereof.

Once the specific capsule has been retrieved at 910, at least one payload that is associated with the specific capsule can be retrieved. The payload can be the latest payload that was backed up, or can be any payload associated with the capsule that has been selected. A specific payload can also be requested in the same manner that the specific capsule was requested.

At 920, the application can be recovered based on the extracted installation data, application configuration information and the access parameter from the specific capsule.

At 930, the data generated by, and utilized by the application can be restored from the payload. This restoration process can be done in accordance with metadata that directs which location to restore the data to.

Figure 10:
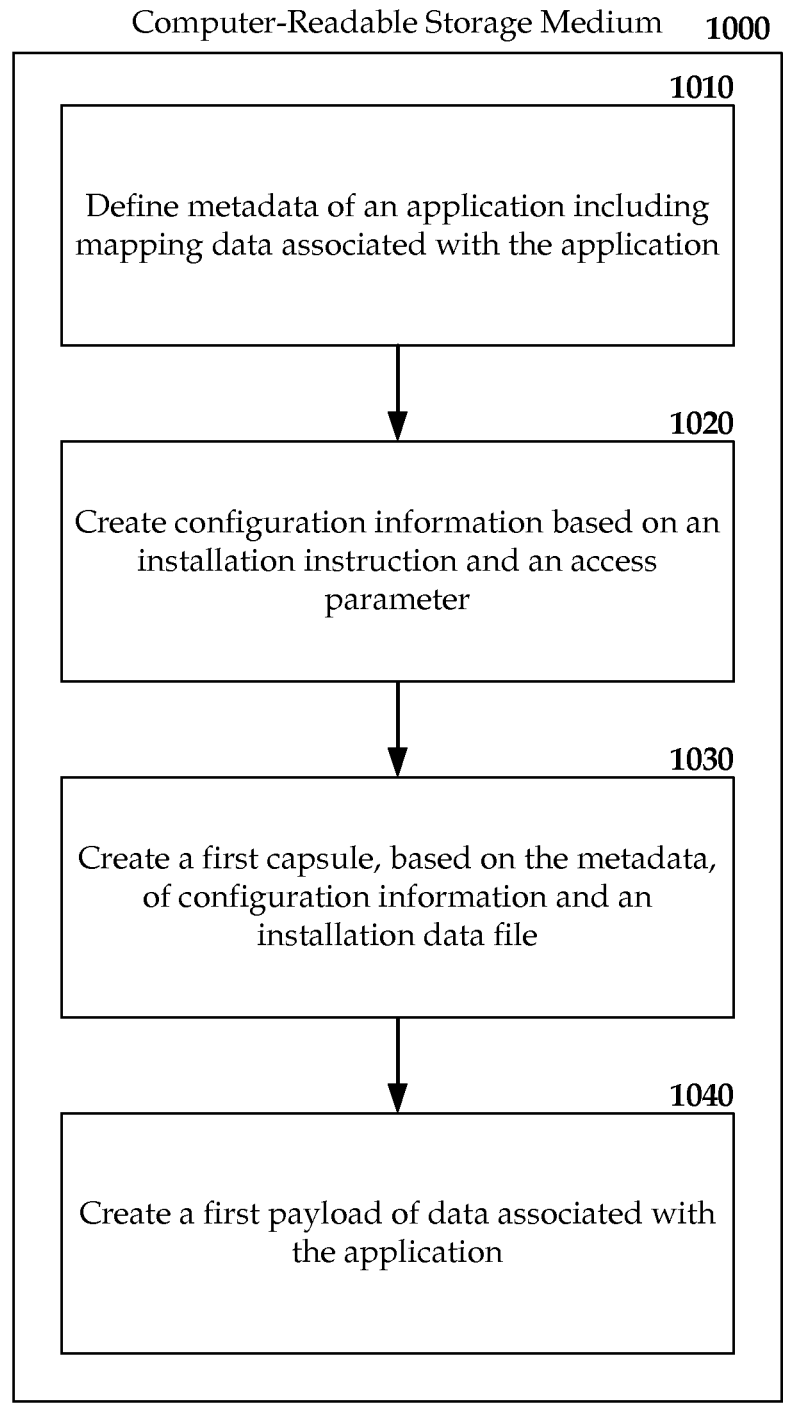
FIG. 10 illustrates a flow diagram of an example, non-limiting embodiment of a set of computer-readable instructions for defining metadata for an application, and creating a capsule and a payload based on the metadata.

FIG. 10 illustrates a flow diagram of an example, non-limiting embodiment of a set of computer-readable instructions for defining metadata for an application, and creating a capsule and a payload based on the metadata. Computer-readable storage medium 1000 can include computer executable instructions. At 1010, the instructions can operate to define metadata of an application including mapping data associated with the application. The metadata can be defined by mapping the location of data that is associated with the application as well as mapping the location of the application itself. Mapping the location of data associated with the application can mapping a logical address, a physical address, or a hierarchical address of the data. The definition process can also determine the type of data that is being mapped, and indicate how the data is used by the application. Some application related data is for the operation or use of the application, while other application related data can be a product of the application. The instructions to define the metadata can also include instructions to determine the installation instructions for installing an application, and extracting an access parameter from the application.

At 1020, these instructions can operate to create configuration information based on the installation instructions and the access parameter. The configuration information is then used at 1030, in conjunction with an installation data file, to create a capsule. The operation is based on the defined metadata from 1010.

At 1040, these instructions can operate to form a payload of data associated with the application. The payload can consist of application specific data that is not used to operate the application, but is instead data that is generated by or utilized by the operation.

Example Computing Environment

Figure 11:
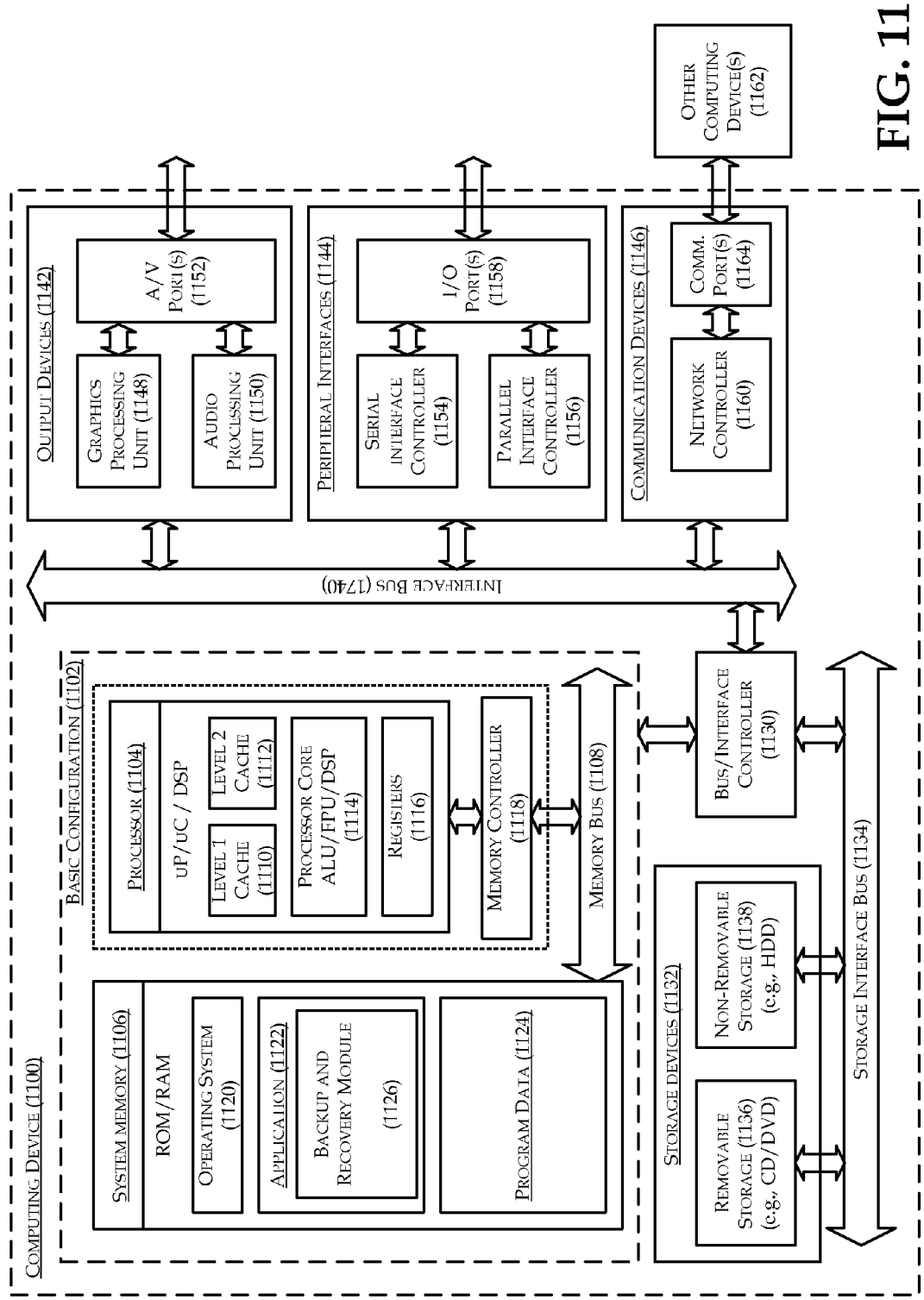
FIG. 11 is a block diagram illustrating an example computing device that is arranged for backing up and restoring applications.

FIG. 11 is a block diagram illustrating an example computing device 1100 that is arranged for backing up and restoring applications. In a very basic configuration 1102, computing device 1100 typically includes one or more processors 1104 and a system memory 1106. A memory bus 1108 may be used for communicating between processor 1104 and system memory 1106.

Depending on the desired configuration, processor 1104 may be of any type including but not limited to a microprocessor (W), a microcontroller (μC), a digital signal processor (DSP), or any combination thereof. Processor 1104 may include one more levels of caching, such as a level one cache 1110 and a level two cache 1112, a processor core 1114, and registers 1116. An example processor core 1114 may include an arithmetic logic unit (ALU), a floating point unit (FPU), a digital signal processing core (DSP Core), or any combination thereof. An example memory controller 1118 may also be used with processor 1104, or in some implementations memory controller 1118 may be an internal part of processor 1104.

Depending on the desired configuration, system memory 1106 may be of any type including but not limited to volatile memory (such as RAM), non-volatile memory (such as ROM, flash memory, etc.) or any combination thereof. System memory 1106 may include an operating system 1120, one or more applications 1122, and program data 1124. Application 1122 may include a backup and recovery module 1126 that is arranged to perform the functions as described herein. Program data 1124 may include backup and recovery process and resource information. In some embodiments, application 1122 may be arranged to operate with program data 1124 on operating system 1120.

Computing device 1100 may have additional features or functionality, and additional interfaces to facilitate communications between basic configuration 1102 and any required devices and interfaces. For example, a bus/interface controller 1130 may be used to facilitate communications between basic configuration 1102 and one or more data storage devices 1132 via a storage interface bus 1134. Data storage devices 1132 may be removable storage devices 1136, non-removable storage devices 1138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1106, removable storage devices 1136 and non-removable storage devices 1138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100.

Computing device 1100 may also include an interface bus 1140 for facilitating communication from various interface devices (e.g., output devices 1142, peripheral interfaces 1144, and communication devices 1146) to basic configuration 1102 via bus/interface controller 1130. Example output devices 1142 include a graphics processing unit 1148 and an audio processing unit 1150, which may be configured to communicate to various external devices such as a display or speakers via one or more A/V ports 1152. Example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. An example communication device 1146 includes a network controller 1160, which may be arranged to facilitate communications with one or more other computing devices 1162 over a network communication link via one or more communication ports 1164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 may also be implemented as a personal computer including both laptop computer and non-laptop computer configurations.

The subject disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:

1. A method, comprising:
receiving, by at least one computing device, metadata associated with an application, wherein the metadata comprises first data related to the application and second data related to a mapping of a network that includes a plurality of storage locations, and wherein the mapping of the network is determined based on an identification of the plurality of storage locations that store the first data related to the application;

based on an analysis of the first data and the second data, determining the first data related to the application that corresponds to a first portion of information relating to the application, and determining a second portion of information relating to the application different than the first portion of information, wherein the first portion of information includes information associated with at least one modification of the application and at least one user selectable configuration of the application that reinstalls the application, wherein the second portion of information includes information related to application specific data that is generated by the application during usage of the application, and wherein the second portion of information restores the application specific data after the reinstallation of the application;

identifying an access parameter associated with the application, wherein the access parameter facilitates access to the application;

collecting, from one or more storage locations determined from the plurality of storage locations, based on the second data, the first portion of information that is used in execution of the application;

collecting, from one or more other storage locations determined from the plurality of storage locations, based on the second data, the second portion of information that is generated by the application, wherein the one or more other storage locations are different than the one or more storage locations;

encapsulating the access parameter and the first portion of information collected from the one or more storage locations, of the plurality of storage locations, based on the metadata into a capsule for the application;

encapsulating the second portion of information collected from the one or more other storage locations, of the plurality of storage locations, based on the metadata into a payload for the application that is distinct from the capsule for the application;

assigning a first identifier to the capsule and a second identifier to the payload;

associating the first identifier with the second identifier;

detecting an alteration of an address block associated with at least one of the first portion of information or the second portion of information;

encapsulating an other capsule and an other payload associated with the first portion of information or the second portion of information, as altered, in response to the detecting the alteration;

assigning a third identifier to the other capsule and a fourth identifier to the other payload;

associating the third identifier with the first identifier, and the fourth identifier with the second identifier, wherein associated capsules and associated payloads are distinct from each other; reinstalling the application based on the first portion of information; and restoring the application specific data after the reinstallation of the application.

2. The method of claim 1, wherein the collecting the first portion of information comprises collecting at least one of application installation data, configuration information, or an access parameter.

3. The method of claim 1, wherein the collecting the second portion of information comprises collecting at least one of data generated by the application or data utilized by the application.

4. The method of claim 1, wherein the encapsulating the access parameter and the first portion of information comprises forming a first capsule that comprises the access parameter and the first portion of information, and wherein the encapsulating the second portion of information comprises forming a first payload that comprises the second portion of information.

5. The method of claim 4, further comprising storing the first capsule or the first payload, which are associated with a computing device of the at least one computing device, on at least one of a local hard drive, an external hard drive, a flash memory, or a network storage device, wherein the assigned first identifier and the second identifier identify the computing device associated with the capsule and the payload of the application.

6. The method of claim 4, wherein the encapsulating the other capsule includes re-encapsulating the first portion of information, as altered, and forming a second capsule that comprises the first portion of information, as altered.

7. The method of claim 6, further comprising:
associating the second capsule with the first capsule and the first payload.

8. The method of claim 4, wherein the encapsulating the other payload includes re-encapsulating the second portion of information, as altered, and forming a second payload that comprises the second portion of information, as altered.

9. The method of claim 8, further comprising:
associating the second payload with the first capsule and the first payload.

10. The method of claim 1, wherein the encapsulating the other payload includes re-encapsulating the second portion of information, as altered, in accordance with a schedule.

11. The method of claim 1, wherein the receiving the metadata comprises receiving a location of the plurality of storage locations that store the first data.

12. The method of claim 1, wherein the first identifier, the second identifier, the third identifier, and the fourth identifier each indicate a time and date of encapsulation, a name of the application, a version of the application, and a device on which the application is installed.

13. A system, comprising:
a processor, coupled to a memory, configured to execute or facilitate execution of computer-executable instructions to at least:
generate a map of network that includes a physical location, wherein the map of the network is determined based on an identification of the physical location that store data related to an application;
determine a first set of the data that corresponds to a first data type that is used in reinstallation of the application and determine a second set of the data that corresponds to a second data type that is related to application specific data that is generated by the application during usage of the application, wherein the first data type comprises a recovery parameter that is associated with at least one modification of the application and at least one user selectable configuration of the application, wherein the recovery parameter is configured to facilitate recovery of the application, and wherein the second data type restores the application specific data after reinstallation of the application;
encapsulate the recovery parameter and the first set of the data based on a first set of locations associated with the physical location of the data to create a capsule;

encapsulate the second set of the data based on a second set of locations associated with the physical location of the data to create a payload that is different than the capsule;

store the capsule and the payload;

determine that an alteration of an address block associated with the data related to the application has occurred;

create an other capsule or an other payload associated with the application in response to a determination that the alteration has occurred, wherein the other capsule and the other payload are different than the capsule and the payload respectively;

assign identifiers to the capsule, the payload, the other capsule, and the other payload, wherein the identifiers indicate that the capsule, the payload, the other capsule, and the other payload are related to each other; reinstalling the application based on the first portion of information; and restoring the application specific data after the reinstallation of the application.

14. The system of claim 13, wherein at least a portion of the data is stored locally or by a network data store.

15. The system of claim 13, wherein the processor is configured to further execute or facilitate execution of the computer-executable instructions to analyze the data pre-associated with the application.

16. The system of claim 13, wherein the data related to the application comprises configuration information, installation data, an access parameter, a third set of the data generated by the application and a fourth set of the data utilized by the application.

17. The system of claim 16, wherein the first set of the data comprises at least one of the configuration information, the installation data, or the access parameter, and wherein the second set of the data comprises at least one of the third set of the data generated by the application or the fourth set of the data utilized by the application.

18. The system of claim 13, wherein the processor is configured to further execute or facilitate execution of the computer-executable instructions to:

determine a version of the application, indicate the version of the application to which the other capsule and the capsule correspond, and indicate a plurality of payloads that correspond to a repackaged capsule and the capsule.

19. The system of claim 13, wherein the capsule and the payload associated with a computing device are stored by at least one of a local hard drive, an external hard drive, a flash memory, or a network storage device, and wherein the assigned identifiers identify the computing device associated with the capsule and the payload of the application.

20. The system of claim 13, wherein each identifier indicates a time and date of encapsulation, a name of the application, a version of the application, and a device on which the application is installed.

21. A computer-readable storage medium having stored thereon computer executable instructions that, in response to execution, cause a system comprising a processor to perform operations comprising:

defining metadata of an application that includes generation of map information for data associated with the application and creating configuration information based on an installation instruction or an access parameter that enables access to the application, wherein the map information comprises a network mapping that includes a plurality of storage locations, and wherein the map information is determined based on an identification of the plurality of storage locations that store the data related to the application;

based on an analysis of the data associated with the application, determining that a first portion of the data associated with the application and a second portion of the data associated with the application respectively are a first data type that is used in reinstallation of the application and a second data type that includes information related to application specific data that is generated by the application during usage of the application, wherein the first portion of the data includes data associated with at least one modification of the application and at least one user selectable configuration of the application, and wherein the second data type restores the application specific data after reinstallation of the application;

determining, based on the map information, a first storage location for the first portion of the data;

determining, based on the map information, a second storage location for the second portion of the data;

creating, based on the metadata and the first storage location of the plurality of storage locations for the first portion of the data, a first capsule that comprises the first portion of the data associated with the application, the configuration information, an installation data file, and the access parameter;

creating, based on the metadata and the second storage location of the plurality of storage locations for the second portion of the data, a first payload that comprises the second portion of the data associated with the application;

detecting an alteration of the data associated with the application;

creating at least one of a second capsule or a second payload based on a type of the data associated with the application that was altered, wherein the second capsule is different from the first capsule and the second payload is different than the first payload;

assigning identifiers to the first capsule, the first payload, the second capsule, and the second payload, wherein the identifiers comprise respective indications of inter-relationships of the first capsule, the first payload, the second capsule, and the second payload; reinstalling the application based on the first portion of information; and restoring the application specific data after the reinstallation of the application.

22. The computer-readable storage medium of claim 21, the operations further comprising:

storing the first capsule and the first payload, which are associated with a computing device, on at least one of a network server, a local storage device, a flash memory, or an external hard drive, wherein the assigned identifiers identify the computing device associated with the capsule and the payload of the application.

23. The computer-readable storage medium of claim 21, wherein the operations further comprise:

storing the at least one of the second capsule or the second payload in association with the first capsule and the first payload;

assigning an application version to the first capsule and the second capsule; and associating the first payload and the second payload with corresponding capsules of the first capsule and the second capsule.

24. The computer-readable storage medium of claim 23, wherein the storing further comprises:

time-stamping each of the first capsule, the second capsule, the first payload, and the second payload with a time and date.

25. The computer-readable storage medium of claim 21, wherein each identifier indicates a time and date of encapsulation, a name of the application, a version of the application, and a device on which the application is installed.

\* \* \* \* \*